April 13, 1926.
N. H. GILMAN
CONNECTING ROD BEARING
Filed June 16, 1923
1,581,083
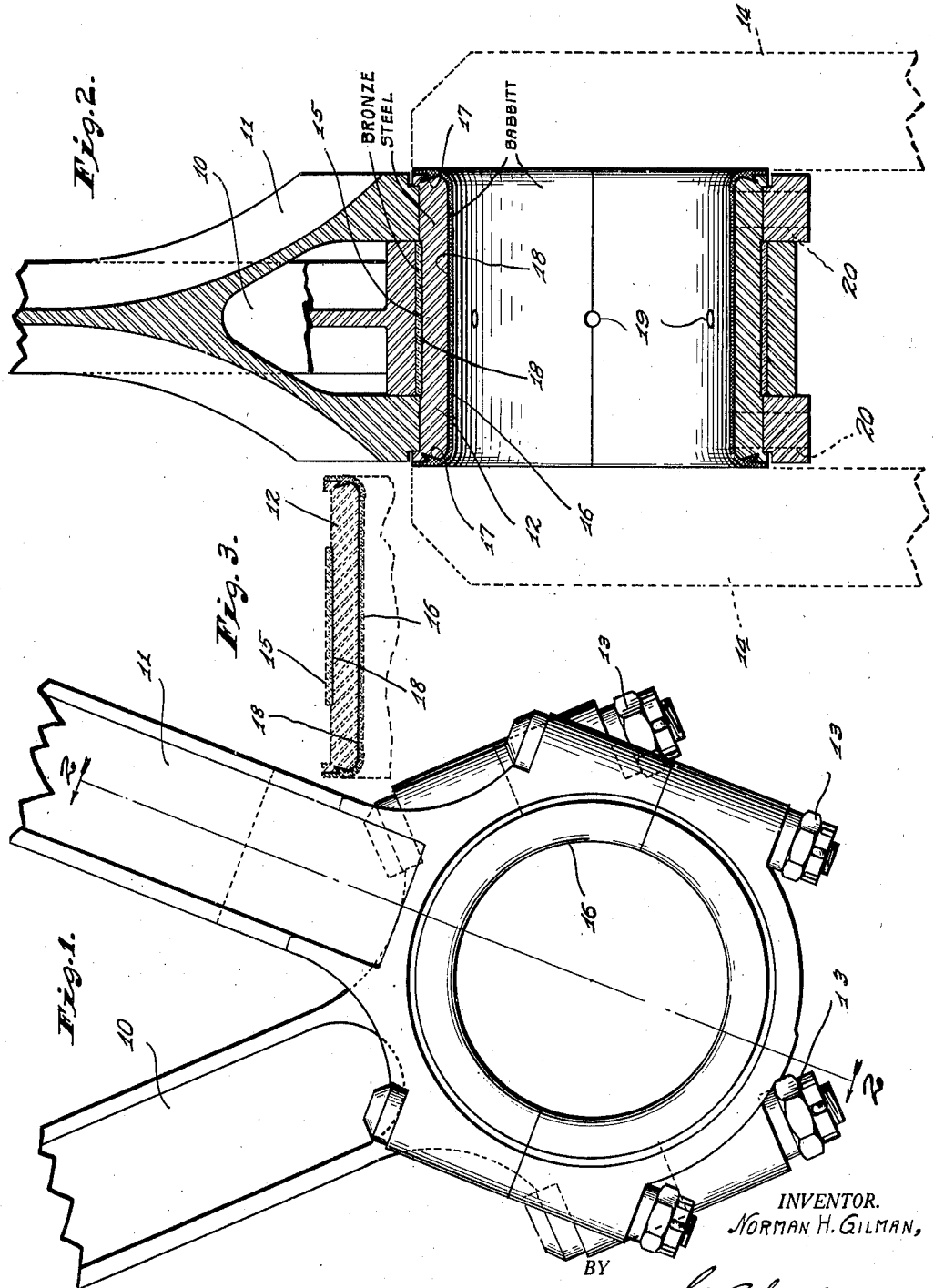
INVENTOR.
NORMAN H. GILMAN,
BY
ATTORNEY.

Patented Apr. 13, 1926.

1,581,083

UNITED STATES PATENT OFFICE.

NORMAN H. GILMAN, OF INDIANAPOLIS, INDIANA, ASSIGNOR TO ALLISON ENGINEER-
ING COMPANY, OF INDIANAPOLIS, INDIANA, A CORPORATION OF INDIANA.

CONNECTNG-ROD BEARING.

Application filed June 16, 1923. Serial No. 645,792.

*To all whom it may concern:*

Be it known that I, NORMAN H. GILMAN, a citizen of the United States, residing at Indianapolis, in the county of Marion and State of Indiana, have invented a new and useful Connecting-Rod Bearing, of which the following is a specification.

It is the object of my invention to lengthen the life of the bearings of the connecting rods on the cranks of the crank-shafts of V-type internal combustion engines; and thereby to lengthen the working life of the engine before overhauling is required.

In the V-type engine, the connecting rods from the pistons of the two cylinders in the same plane transverse to the crank-shaft are connected to the same crank of the crank-shaft. It is accepted that the best way of making this connection is by having one of the connecting rods mounted on the crank at the middle thereof, while the other connecting rod is bifurcated and is mounted on the two end portions of the crank, astride the first connecting rod; and that there shall be an interposed bushing between the connecting rods and the crank, to which bushing the connecting rod with the bifurcated end is clamped while the other connecting rod is oscillatingly movable on such bushing as required by the variation in angle between the two connecting rods. This bushing has heretofore usually been made of bronze, with a Babbitt-metal lining for the bearing surface on the crank of the crank-shaft. The bronze was used largely because of its own bearing qualities, as it was necessary that there be a bearing both on the inside of this bushing, with the crank of the crank-shaft, and on the outside thereof, with the connecting rod mounted on its middle.

It has been found in practice that this bronze bushing distorts in action, especially at the ends thereof where the bifurcated connecting rod is clamped to it; and that this distortion results in a destruction of the bearing surfaces, a concentration of the load in spots on the bearing surfaces, and a disintegration and flaking off and pitting of the Babbitt-metal lining, especially at the ends. This is all the more the case because the dimensions of the whole connecting-rod unit are necessarily restricted. This destruction of bearing surface on the inside of the bushing has been one of the main features in limiting the working life of V-type motors, and has cut down the effective life of such motors as the Liberty motor to only a fraction of what it would otherwise be. While this Babbitt-metal lining can be replaced, that is a fairly expensive job, requiring the tearing down of the whole engine.

Specifically, my present invention contemplates a structure in which this distorting of the bushing at the crank-ends of these connecting rods is greatly reduced, so that the Babbitt lining will remain in working condition throughout a life several times the maximum previously obtainable. In other words, by a simple change in this bushing, I increase the life of the Liberty motor (for example) several fold.

In doing this, I make the bushing fundamentally of steel, instead of bronze; for steel has a modulus of elasticity more than twice that of bronze, so that its distortion under the same stresses is very much less than that of bronze. I associate this steel bushing with suitable liners of bearing metal, inside and out, at the desired places, to prevent the sliding bearing of two like metals on each other; and in doing this I provide certain details of structure which materially assist in getting the desired life.

The accompanying drawing illustrates my invention: Fig. 1 is an axial end elevation of the crank-end, embodying my invention, of a connecting-rod unit of a V-type motor; Fig. 2 is a section on the line 2—2 of Fig. 1, with the cheek-pieces of the associated crank shown in dotted lines; and Fig. 3 is a sectional detail which indicates the bushing structure per se with the tinning brought out as a heavy line against the dotting of the remainder, to show it more clearly.

The connecting rods 10 and 11 are shown as of the standard construction used in the Liberty motor. The crank-end of the connecting rod 10 oscillates on the bushing 12; while the crank-end of the connecting rod 11 is bifurcated and set astride the corresponding end of the connecting rod 10, and is clamped on the axial ends of the bushing 12. The crank-ends of both the connecting rods are split, as usual, and the halves thereof are fastened together by the usual clamping bolts 13 for that purpose; the clamping bolts 13 for the end of the connecting rod 11 set it tight on the bushing, while those for the end of the connecting rod 10 leave sufficient looseness for the oscillation of such connecting rod. The bushing 12 is likewise split, and is of proper length and diameter to be received on a crank of the crank-shaft, of which only the two cheek-pieces 14 between which such crank is located are indicated, in dotted lines.

According to my invention, the bushing 12 is made of steel. It is surrounded at the longitudinal middle part by a bearing-metal liner 15, split with the bushing, on which liner the crank-end of the connecting rod 10 may oscillate with a suitable bearing surface. This liner 15 is preferably of bronze, and is suitably held fast on the steel bushing 12, and is preferably set in a shallow circumferential recess in such steel bushing. The inner surface of the steel bushing 12 and the axial end surfaces thereof are covered with a liner of Babbitt-metal 16, likewise split; for such bushing has rotatable sliding engagement not only with the crank upon which it fits but also with the adjacent faces of the cheek-pieces 14. To assist in holding the Babbitt-metal liner 16 in place, surfaces of the steel bushing 14 are preferably provided with undercut grooves 17; which grooves are preferably located in the axial end faces of such bushing, as is clear from Fig. 2.

The liner 15 when made of bronze may be fastened in place in several ways. For example, the bronze liner 15 is carefully fitted and set in place in its groove on the steel bushing 12, and then the whole bushing with such liner thereon is tinned, as by dipping in a bath of melted tinning material of suitable nature. The tinning material runs through and fills the space between the bronze liner 15 and the steel bushing 12, and binds such liner firmly to such bushing. Instead, the steel bushing may be tinned first, and the bronze liner then cast in place. In addition, the tinning material forms a thin coating over the entire steel bushing. This coating of tinning material not only binds the bronze liner in place, but also provides a surface to which the Babbitt-material liner 16 will adhere much better than it will to steel. After this tinning has been done, the Babbitt-material layer 16 is put in place in any usual way, as by centrifugal depositing. When the Babbitt material has been put on, the completely assembled bushing is machined, to provide surfaces of the desired dimensions. In this finishing, the tinning is removed from the outer surface of the steel bushing 12 near the end thereof, where such bushing is to receive the bifurcated end of the connecting rod 10. I have indicated this layer of tinning material 18 by a heavy line, in both Fig. 2 and Fig. 3, to show where it is in the finished bushing.

The steel bushing 12 and its bronze and Babbitt liners 15 and 16 may be provided with any suitable grooves or holes, for oil supply and distribution. As these may take any form, they are not shown in detail, though a few oil-supply holes 19 are indicated in Fig. 2. Further, to assist in holding the bushing 12 from turning in the crank-end of the connecting rod 11, such crank-end may be provided with suitable locking pins 20, indicated in dotted lines in Fig. 2, and projecting from such connecting-rod end into the outer part of the steel bushing 12. This locking by pins 20, however, is usual, and is not essential to my invention.

By reason of the greater modulus of elasticity of steel, the bushing 12 is subject to only a fraction of the distortion to which a bronze bushing is subject. In consequence of this less distortion, there is much less tendency for the Babbitt-metal liner 16 to disintegrate and flake off and pit, and to concentrate its load in spots; and the life of such Babbitt-metal liner is increased in much greater proportion than the ratio of the modulus of elasticity of the two metals referred to. At the same time, proper bearing surfaces are provided for the crank, for the cheek-pieces 14, and for the connecting rod 10 which osclilates on the bushing.

I claim as my invention:

1. A bushing structure for the crank-ends of connecting rods of V-type engines, comprising a steel bushing, an outer liner of bearing metal on the middle part of said bushing for receiving the crank-end of one connecting rod, with the end portions of such steel bushing arranged to receive a bifurcated crank-end of a second connecting rod set astride the first, and an inner liner of bearing metal in said steel bushing.

2. A bushing structure for the crank-ends of connecting rods of V-type engines, comprising a steel bushing, an outer liner of bearing metal on said bushing for receiving the crank-end of a connecting rod, and an inner liner of bearing metal in said steel bushing.

3. A bushing structure for the crank ends of connecting rods of V-type engines comprising a steel bushing, an outer liner of bearing metal on the middle part of said bushing for receiving the crank-end of one connecting rod with the end portions of such steel bushing arranged to receive a bifurcated crank-end of a second connecting rod set astride the first said outer liner of bearing metal being united to said bushing by a solid soldered joint, substantially as set forth.

4. A bushing structure for the crank-ends of connecting rods of V-type engines, comprising a steel bushing, an outer liner of bearing metal on said bushing for receiving the crank-end of a connecting rod, said outer liner of bearing metal being united to said bushing by a solid soldered joint, substantially as set forth.

5. The combination set forth in claim 2, with the addition that the inner liner of bearing metal extends over the axial end surfaces of said steel bushing.

6. The combination set forth in claim 2, with the addition that the steel bushing has a shallow groove in which said outer liner is received.

In witness whereof, I have hereunto set my hand at Indianapolis, Indiana, this 14th day of June, A. D. one thousand nine hundred and twenty three.

NORMAN H. GILMAN.